March 22, 1927.  J. C. M. MASSEY  1,621,942
MOTOR VEHICLE
Filed April 15, 1925
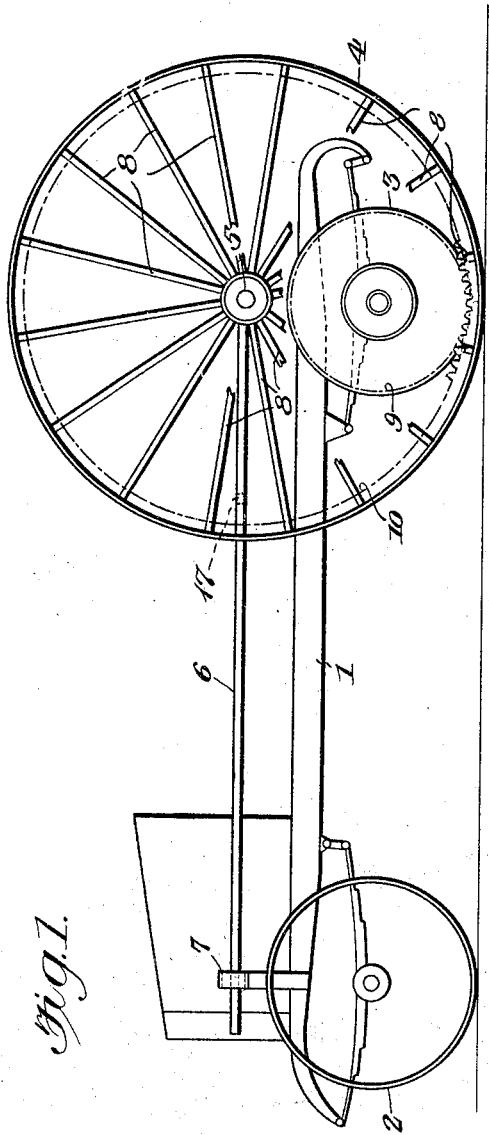
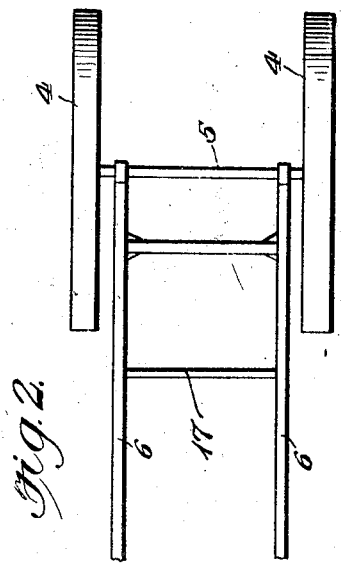
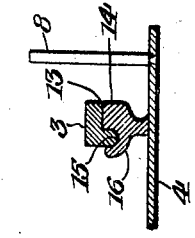
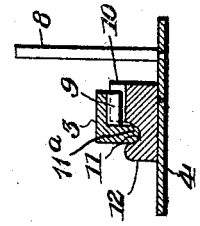
Inventor
Juan Carlos Molina Massey,
By
Attorney Patented Mar. 22, 1927.

1,621,942

UNITED STATES PATENT OFFICE.

JUAN CARLOS MOLINA MASSEY, OF BUENOS AIRES, ARGENTINA.

MOTOR VEHICLE.

Application filed April 15, 1925, Serial No. 23,312, and in Argentina December 11, 1924.

My present invention relates to certain improvements in motor car vehicles of any type, particularly tractors and the like, its main object being to adapt to the rear wheels thereof circular rails by which their adhesive power is increased and thus adapt them for travelling over any kind of roads.

My present invention has also for its object a method by which ordinary motor cars may be easily converted into tractors.

The invention has other objects in view which will be understood in the following description and particularly set forth in the appended claims.

In order that my present invention may be clearly understood and easily carried into practice a preferred embodiment thereof has been shown in the appended drawings wherein, Figure 1 is a side view of a motor car frame with the improvement according to my present invention.

Figure 2 is a plan view of the car having the circular rails.

Figure 3 is a sectional view on a larger scale which shows the manner in which the driving wheel gears with the circular rail.

Figure 4 is a like view of a modified construction.

Similar characters of reference denote the same or like parts throughout the said figures.

In the embodiment shown, 1 is the vehicle frame having front steering wheels 2 and rear driving wheels 3. According to the present invention the latter wheels are built in the form of toothed wheels the teeth of which mesh with the inner teeth 10 of a circular rail 4, which by means of the spokes 8 is rotatably mounted upon a floating axle 5, said axle being totally independent from the vehicle frame. Two bars 6 are mounted on the said axle and by means of a transverse bar 17 they form a rigid frame, the bars 6 being guided in their front portion in forks 7 fixed to the vehicle frame, so that all lateral dislodgment is avoided and advancing and receding movements are only possible during the movement of the vehicle. In order to avoid a bad meshing of the teeth 9 and 10, and at the same time, in order to serve as a guide between the wheels 3 and 4 the latter has preferably a flange 12 and a recess 11 in the rail of the wheel 4 which guides the wheel 3 by means of a flange 11$^a$ on wheel 3.

Instead of using a toothed wheel, an ordinary track wheel as shown in Figure 4 may also be employed, 13 being the wearing surface which rests upon the rail 14 and the rim of the wheel, having as in the abovementioned case a flange 15 which runs in the recess formed by the flange 16 of the rail. In the present instance, the friction due to the weight of the vehicle is sufficient to keep the driving thereof.

Due to the fact that the wheels or circular-rails 4 are mounted upon their axles so that they may readily be dismantled, it is very easy to remove the wheels 3 and to replace them by ordinary wheels with rubber tires or the like, the vehicle retaking then its ordinary condition.

It is obvious that many constructional and other changes may be made without departing from the scope of my present invention which has been clearly set forth in the appended claims.

Having now fully described and ascertained the nature of my present invention and in what manner the same is to be carried into practice I declare that what I claim and desire to protect by Letters Patent is:

1. A motor vehicle comprising a frame; a driving wheel mounted in said frame; a circular rail, said wheel being adapted to contact on the inside of and drive said rail; and a bar slidably guided in said frame for mounting said circular rail on the frame in order to permit longitudinal movement relative to said frame.

2. A motor vehicle comprising a frame; a pair of driving wheels mounted on said frame; a pair of circular rails, said wheels being adapted to contact on the inside of and drive said rails; means on the wheels and rails in order to provide positive driving connections; an axle for said rails, and a pair of bars secured to said axle and guided on the frame in order to permit longitudinal movement relative to said frame.

3. A motor vehicle comprising a frame; a pair of driving wheels mounted on said frame; a pair of circular rails, said wheels being adapted to contact on the inside of and drive said rails; a pair of forks mounted on said frame; and a pair of bars secured to said axle and guided in said forks in order to permit longitudinal movement relative to said frame.

4. A motor vehicle comprising a frame; a pair of driving wheels mounted on said frame; a pair of circular rails, said wheels being adapted to contact on the inside of and drive said rails; means on the wheels and rails in order to provide positive driving connections; a pair of forks mounted on said frame; and a pair of bars secured to said axle and guided in said forks in order to permit longitudinal movement relative to said frame.

In testimony whereof I affix my signature.

JUAN CARLOS MOLINA MASSEY.